J. TRUAX.
JACK.
APPLICATION FILED MAR. 25, 1918.
1,289,971.
Patented Dec. 31, 1918.
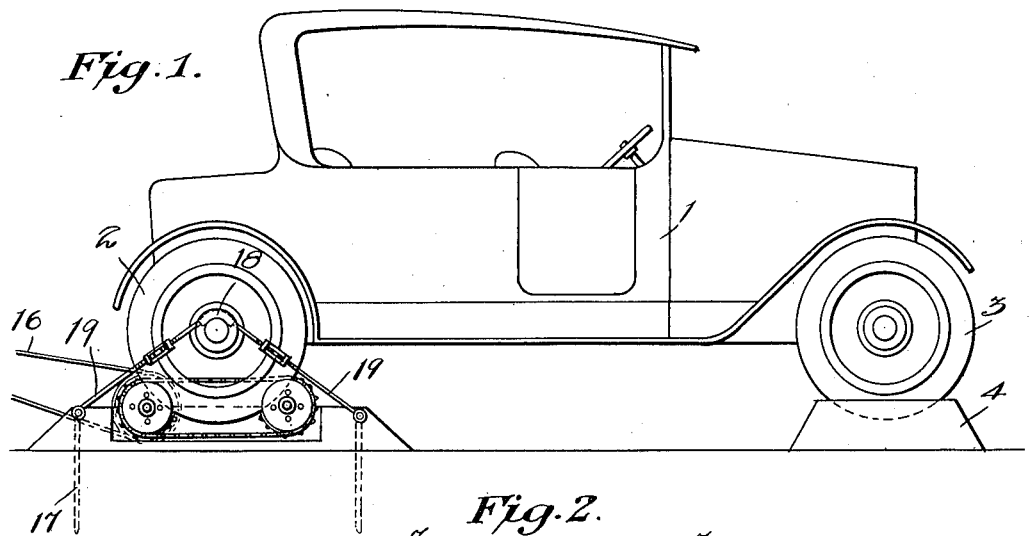
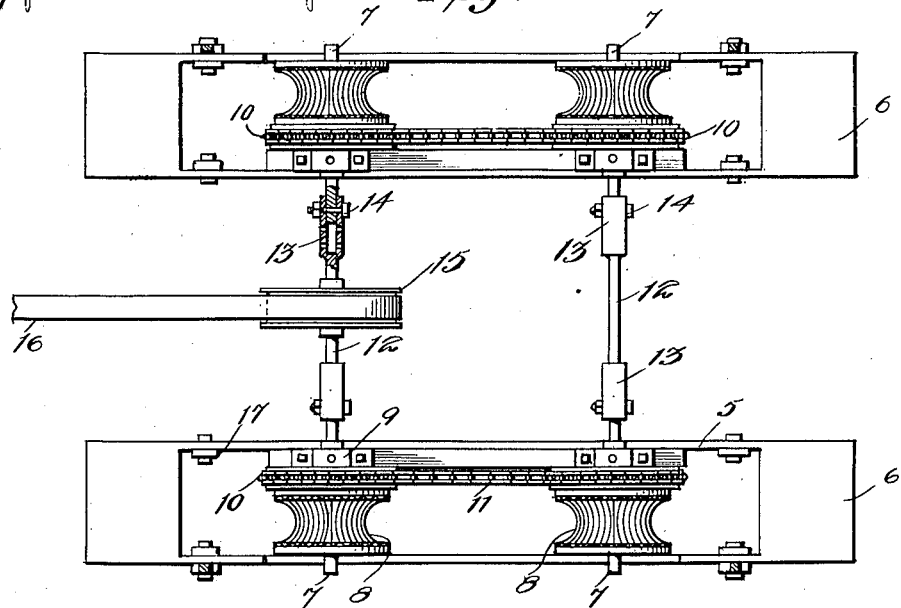
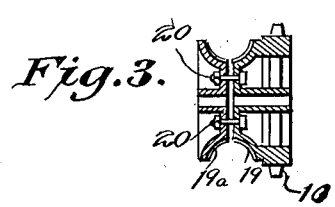
WITNESSES
INVENTOR
John Truax
BY
ATTORNEYS

UNITED STATES PATENT OFFICE.

JOHN TRUAX, OF SYCAMORE, OHIO.

JACK.

1,289,971.  Specification of Letters Patent.  Patented Dec. 31, 1918.

Application filed March 25, 1918. Serial No. 224,670.

*To all whom it may concern:*

Be it known that I, JOHN TRUAX, a citizen of the United States, and a resident of Sycamore, in the county of Wyandot and State of Ohio, have invented certain new and useful Improvements in Jacks, of which the following is a specification.

My invention is an improvement in jacks for supporting the rear wheels of a motor vehicle out of contact with the ground and in contact with rotatable members which may be driven by the rear wheels to enable the power of the motor to be utilized in other work than in driving the vehicle.

In the drawings:

Figure 1 is a side view showing the improved jack in place;

Fig. 2 is a top plan view of the jack, with parts in section;

Fig. 3 is a sectional view showing a split pulley or tread wheel;

Fig. 4 is a transverse section through one of the base beams.

The present embodiment of the invention is shown in connection with a motor vehicle 1, the jack being arranged beneath the rear wheels 2 to support the said wheels out of contact with the ground and free to rotate. The front wheels 3 are supported by a suitable support 4 which may be of any usual or desired construction.

The jack comprises a pair of spaced parallel base beams 5, each of which is of channel material as shown in Fig. 4, and the ends of each beam are closed by inclined portions 6, as shown. A pair of shafts 7 is journaled in the channel of each base beam, the said shafts being parallel and spaced apart from each other, and a tread wheel or pulley is secured to each shaft. The shafts are journaled in bearings 9, and the tread wheels have concave peripheries, as shown, the said peripheries being corrugated or roughened transversely in order to provide for a close frictional engagement with the wheels 2 of the motor vehicle.

Each tread wheel has secured thereto at its inner end a sprocket wheel 10, and the sprocket wheels of the tread wheels of each beam are connected by a sprocket chain 11. The inner ends of the shafts 12 extend inwardly beyond the side walls of the beam 6 and the adjacent ends of corresponding shafts 7 are connected together. The said ends are connected by a connecting shaft 12, which is provided at its ends with sockets 13 for receiving the ends of the shafts 7, and the sockets and the shafts have registering openings for receiving a bolt 14 to connect the sockets to the shaft ends. Each bolt is engaged by a nut, and it will be noticed that a series of openings is provided in each socket, permitting the beams to be adjusted toward and from each other to fit vehicles having different wheel bases.

A pulley 15 is secured to one of the shafts 12, preferably the rear one, and by means of a belt 16 this pulley may be connected to the machinery or the like which is to be driven. Means is provided for anchoring the beam, the said means consisting of stakes or bolts 17, which are connected to the beams near their ends and which may be driven into the ground as shown, or secured to a floor.

A stirrup 18 is provided at each inside beam for engaging over the floating axle adjacent to either wheel, and each end of the stirrup is connected to the adjacent end of the beam by a turnbuckle 19 of usual construction. By means of the turnbuckles the stirrups may be drawn down upon the axle.

In operation, the motor of the vehicle, when the parts arranged as shown in Fig. 1, is started in the usual manner. The rear wheels will rotate, rotating the wheels 8, and the belt 16 will drive the machinery to be driven.

In Fig. 3 is shown a preferred form of tread wheel, the wheel consisting of sections 19 and 19ª which are connected by bolts and nuts 20, the sprocket wheel 10 being an integral portion of the section 19. The wheel is divided into sections at the center of the concave periphery, and it will be evident that by means of the bolts and nuts the sections may be adjusted to correspond with any size tire.

The stirrups 18 are also for the purpose of holding the motor wheels on the tread wheels and for making the proper pressure on the tread wheels.

I claim:

1. A device of the character specified, comprising a pair of base beams, a pair of shafts journaled transversely of each beam and in spaced parallel relation, a tread wheel secured to each shaft for engagement by the wheels of a motor vehicle, a connection between the shafts of the corresponding wheels for constraining them to rotate together, said connection being adjustable to permit the beams to be adjusted toward and from each other, a driving connection between the shafts of each beam, one of the connecting shafts having a pulley for the purpose specified, and each tread wheel consisting of sections movable toward and from each other to provide for tires of different sizes.

2. A device of the character specified, comprising a pair of base beams, a pair of shafts journaled transversely of each beam and in spaced parallel relation, a tread wheel secured to each shaft for engagement by the wheels of a motor vehicle, a connection between the shafts of the corresponding wheels for constraining them to rotate together, said connection being adjustable to permit the beams to be adjusted toward and from each other, and a driving connection between the shafts of each beam.

3. A device of the character specified, comprising a pair of base beams, a pair of shafts journaled transversely of each beam and in spaced parallel relation, a tread wheel secured to each shaft for engagement by the wheels of a motor vehicle, a connection between the shafts of the corresponding wheels for constraining them to rotate together, and a driving connection between the shafts of each beam.

JOHN TRUAX.